Patented Nov. 1, 1932

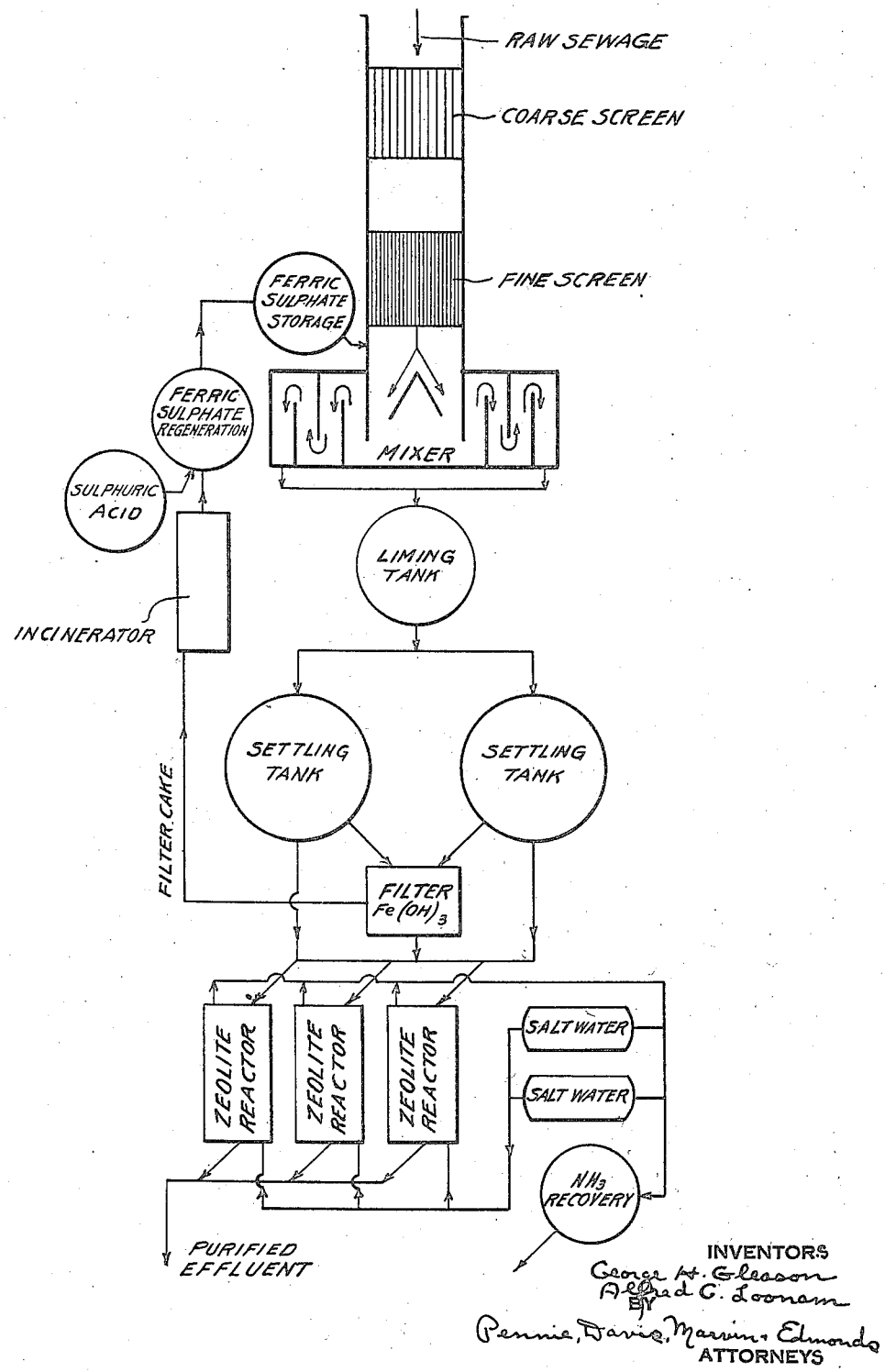

1,886,267

UNITED STATES PATENT OFFICE

GEORGE H. GLEASON, OF MONTCLAIR, NEW JERSEY, AND ALFRED C. LOONAM, OF BROOKLYN, NEW YORK, ASSIGNORS TO GUGGENHEIM BROTHERS, OF NEW YORK N. Y., A COPARTNERSHIP

TREATING SEWAGE

Application filed May 7, 1932. Serial No. 609,968.

This invention relates to the treatment of sewage, and has for its object the provision of an improved method of treating sewage and similar waste liquors.

The high concentration of population in urban districts as well as concentrated industrial activities have given rise to serious problems in stream pollution as a consequence of the discharge therein of raw or only partially purified sewage or other waste liquors. Sewage and waste liquors from domestic, municipal or industrial sources contain varying amounts of putrescible matter. Such putrescible matter consists for the most part of compounds of carbon, sulphur and nitrogen in combination with each other and with other constituents. The discharge of such putrescible matter into rivers, or other bodies of water, pollutes these waters and renders them unfit for the existence of aquatic animal life as well as for various domestic and industrial uses for which the unpolluted waters are naturally adaptable. In some districts this pollution of the contiguous waters, into which sewage containing putrescible matter has been discharged, is not only an offensive nuisance but is a serious menace to public health because of its contamination of water supplies and bathing facilities. For these reasons, it is not only desirable but in many cases necessary, that putrescible matter be removed from sewage or otherwise rendered innocuous and unoffensive before the sewage is finally disposed of by discharge into a contiguous body of water. A simple, efficient and inexpensive method of purifying sewage and waste liquors before disposing of them in streams and the like is accordingly urgently needed.

In ordinary raw sewages and similar waste liquors, the putrescible matter is present in two forms, namely, (1) soluble and hence in solution, and (2) insoluble. The insoluble matter may be present in sizes ranging from coarse and easily screened particles to those of colloidal size. In any sewage treatment operation, it is customary to remove the coarser and heavier insoluble and hence solid materials. This is ordinarily accomplished by screening. But after screening, there remain in the sewage not only the soluble putrescible matter but also finely divided insoluble putrescible matter largely in colloidal suspension.

The concentration of the putrescible matter, both in solution and in suspension, in the screened sewage is extremely low. For example, an average municipal sewage contains around 160 parts per million of dispersed or finely divided solid matter largely in colloidal suspension. In such relatively minute concentrations, the putrescible constituents of such suspended matter react either not at all or very slowly with such quantities of chemicals as would render them innocuous if they were present in a more concentrated form. The direct disposal or destruction of the putrescible matter in sewage is, therefore, neither effective nor practicable.

Our present invention aims to provide an improved process of efficiently purifying sewage by removal and appropriate disposal of the dispersed and insoluble putrescible matter, as well as of a substantial proportion of the soluble and dissolved putrescible constituents. The invention is based on our discovery that by concentrating the suspended putrescible matter in sewage, such matter in its concentrated form may be effectively destroyed or otherwise rendered innocuous, and the residual sewage may thereupon be effectively treated to render the dissolved putrescible constituents innocuous. Thus, the invention contemplates concentrating the suspended putrescible matter, as for example by coagulation, flocculation, or entrainment in a settleable sludge, and the removal and appropriate disposal of the concentrated putrescible matter. Such concentration of the suspended putrescible matter may be advantageously accomplished by precipitating within the sewage a substance capable of collecting the suspended putrescible matter as a settleable sludge, such for example as a metal base or hydroxide. In its complete aspect, the invention contemplates a two-stage treatment process, in the first of which the suspended putrescible matter is concentrated and removed from the sewage, and in the second of which a substantial amount of the dissolved putrescible matter is removed, preferably by a base-exchanging agent or medium, such as a zeolite or the like.

The practical application of the principles of the invention will be best understood from the following description taken in conjunction with the flow sheet of the accompanying drawing. The flow sheet diagrammatically illustrates an arrangement of apparatus adapted for the practice of the invention in its complete and now preferred form.

In carrying out the invention, the finely suspended putrescible matter is concentrated to such a point that it can be easily and effectively removed from the sewage and appropriately treated for disposal. It is now our preferred practice to accomplish this by treating the screened raw sewage with a solution of a metal compound, such as ferric sulphate $Fe_2(SO_4)_3$, in such proportions that the sewage contains from 50 to 200 or more parts per million of iron (Fe), or equivalent metal, depending on the amount of putrescible material to be removed. After thorough mixing, an alkali, preferably lime (CaO) because of its low cost, is added to the sewage, preferably in such proportions that the resulting effluent has a pH value of about 6–8. The alkali precipitates the metal as a hydroxide (e. g. ferric hydroxide $Fe(OH)_3$) which in settling carries down the suspended putrescible matter in such a form as to permit of its separation in any appropriate type of apparatus for the separation of solids and liquids, such for example as a thickener, settler, filter, or equivalent sedimentation or clarifying apparatus.

The aim of this operation is to concentrate the suspended putrescible matter in a settleable sludge, by introducing into the sewage an insoluble substance capable of collecting and carrying down the suspended matter in a settleable sludge, as for example by precipitating iron hydroxide in situ within the sewage. The precipitate of ferric hydroxide, or equivalent metal base, and coagulated or entrained putrescible matter is removed from the residual sewage in the form of a sludge. This sludge may be treated to destroy or otherwise appropriately dispose of the putrescible matter therein, and to recover the metal content thereof. Thus, the sludge may be dewatered or dehydrated, and the resulting product roasted or incinerated to destroy the putrescible matter and to convert the ferric hydroxide to ferric oxide. The ferric oxide, or equivalent metal oxide, is then treated with sulphuric acid to regenerate ferric sulphate.

In actual practice with a sewage containing about 160 parts per million of suspended matter and having a ten-day biological oxygen demand of 200–400 parts per million and a pH of 7.0–7.4, we have found that satisfactory clarification can be obtained by the addition to the sewage of 100 parts per million of iron, in the form of ferric sulphate, and 150 parts per million of lime. An amount of aluminum, in the form of aluminum sulphate, equal to half the weight of the iron can be substituted for the latter with almost equally good results. The lime may be replaced by an equivalent amount of ammonia, sodium hydroxide, sodium carbonate, magnesia, and similar alkalies, if conditions render such replacement advisable.

The residual (and now clarified) sewage overflowing the thickener, or equivalent sedimentation, settling, filtering or other clarifying apparatus, together with the liquor from the dewatering of the sludge, is subjected to a base-exchange reaction in the course of which a substantial amount of the putrescible bases in solution in the sewage are exchanged for or replaced by a non-putrescible base, thereby concentrating such putrescibe bases in an easily treatable and recoverable form. By putrescible base we mean a chemical base which can be utilized as food by bacteria or other forms of life, such as ammonia and the like. Substances in the nature of zeolites capable of base-exchange are suitable base-exchanging mediums for the purpose. Thus, the substitution of a non-putrescible sodium base for the ammonia or similar putrescible base in solution in the sewage may be accomplished by passing the residual sewage through a suitable bed or body of a base-exchange zeolite, such for example as a base-exchange zeolite filter. In this operation, the soluble, strongly basic oxidizable compounds, such as ammonia and other amines, are removed from the sewage by a base-exchange reaction, which may be generally represented by the following equation:

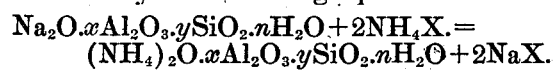
$$Na_2O.xAl_2O_3.ySiO_2.nH_2O+2NH_4X= \\ (NH_4)_2O.xAl_2O_3.ySiO_2.nH_2O+2NaX.$$

In this reaction, the ammonia and the more basic amines in solution in the sewage are practically quantitatively removed and replaced by the alkali metal base (sodium) in the zeolite or the like. The effluent, or filtrate, of this base-exchange operation is a final product, substantially devoid of putrescible matter for all practical purposes, and passes into the receiving body of water for ultimate disposal.

After a reasonable time of operation when the alkali metal of the zeolite has been replaced by ammonia and the like to a sufficiently great extent for efficient operation, the spent base-exchanging medium is treated with a solution of an alkali metal salt to regenerate the medium and to extract and redissolve ammonia, which may be economically recovered in concentrated form. Thus, in the case of a zeolite filter, the filter is backwashed with a strong solution of sodium chloride or common salt (say 200–300 grams per liter). This restores the zeolite to its original condition by reversing the above base-exchange reaction, the ammonia passing into solution as ammonium chloride from which solution it may be readily recovered. For example, the spent salt solution may be treated with lime, or other alkali, and the resulting ammonia distilled off and collected in any appropriate manner. Such recovered ammonia may, if desired, be returned to the first stage of the treatment process as the alkali for precipitating the metal hydroxide.

Each part per million of ammonia nitrogen present will yield approximately ten pounds of ammonia per million gallons of sewage treated, which may, if desired, be recovered in marketable form, thereby substantially reducing the cost of the treatment.

The following examples illustrate the efficacy of treating sewage in accordance with the invention:

(1) Sewage treated with 200 p. p. m. Fe as $Fe_2(SO_4)_3$. $Fe(OH)_3$ precipitated with NaOH.

|  | 10 day B. O. D. | Organic N | Ammonia N |
|---|---|---|---|
| Raw sewage | 199 p. p. m. | 9 p. p. m. | 15 p. p. m. |
| Clarified sewage | 60 | 8 | 12 |
| Final effluent | 52 | 5.7 | 0.3 |

(2) Sewage treated with 100 p. p. m. Fe as $Fe_2(SO)_3$. $Fe(OH)_3$ precipitated with CaO:

|  | 10 day B. O. D. | Organic N | Total N. |
|---|---|---|---|
| Raw sewage | 322 p. p. m. | N. d. | 24 p. p. m. |
| Final effluent | 40 | N. d. | 2 |

In each example, the major part of the nitrogen removal took place in the base-exchange operation, and substantially all of the nitrogen removed in this operation was present in the residual (clarified) sewage as "basic" nitrogen, that is as ammonia or amino compounds.

In the arrangement of apparatus indicated by the flow sheet of the accompanying drawing the raw sewage is first passed through a coarse screen and then through a fine screen to remove the coarse and heavy solid matter. The screened sewage is thoroughly mixed with the added ferric sulphate in a baffle type mixer. We have found it advantageous to aerate the sewage during the mixing or liming operations, since such aeration substantially lowers the biological oxygen demand of the final effluent. Very satisfactory results are obtained by carrying out the liming in an air-agitated tank. The settling or sedimentation tanks are preferably of the continuous operating type in which the settled sludge is continuously withdrawn from the bottom and the residual sewage liquor (clarified sewage) is continuously withdrawn through an overflow launder around the upper periphery of the tank. The residual sewage passes through a battery of zeolite reactors in the nature of filters. The back-washing salt solution may be circulated through the bed of zealite until it has taken up a contemplated amount of ammonia and the like, and the bed of zeolite then given a final back-washing with fresh salt solution.

The amount of suspended solid matter in screened sewage and similar waste liquors may vary considerable, even at the same outfalls, depending upon the instant sources of such liquors. Thus ordinary screened sewage may contain from 50 to 400 or more parts per million of suspended matter. The ordinary run of municipal sewage (screened) will average about 160 parts per million of suspended solids. In our investigations, we have found that iron in an amount of from about one-third to two-thirds the amount of suspended solids present serves effectively (when precipitated as ferric hydroxide) to collect and carry down substantially all of the suspended matter. Where aluminum is used in place of iron, only about half as much, in parts per million, is required. Similarly, in using other insoluble substances as collectors for the suspended matter, the amount required will depend upon the physical characteristics of the substance as well as the amount of suspended matter to be collected and concentrated. In any case such amount of insoluble collecting substance should be used as to effectively concentrate the suspended matter in a form susceptible of subsequent convenient treatment for the destruction or disposal of the putrescible matter therein.

The amount of alkali added to the sewage is preferably such as to impart to the residual (clarified) sewage a pH of about 6–8. When using a metal hydroxide to collect and concentrate the suspended matter, substantially all of the metal added to or present in the sewage should be precipitated as the hydroxide. We have found that the base-exchanging reaction takes place most advantageously when the residual sewage is substantially neutral or slightly alkaline, but is retarded in the case of too alkeline a liquor. While we have carried out the base-exchanging reaction with a residual sewage having a pH as high as 10–11, it is our experience that the reaction proceeds more slowly and less effectively than in the case of a residual sewage whose pH is not substantially higher than about 8. The base-exchanging reaction is only effective with respect to basic nitrogen compounds, such for example as ammonia and some amines in the form of salts and not of the free bases, and a tool alkaline residual sewage is conducive to the conversion of the nitrogen-compounds to the free-base form in which they are not readily amenable, if at all, to the base-exchanging reaction. Because of these considerations, it is our preferred practice to carefully control the pH value of the residual sewage by regulating the amount of added alkali to precipitate substantially all of the metal present as hydroxide and to impart to the residual sewage a pH of about 6–8. To this end, it is our preferred practice to periodically observe the pH value of the incoming sewage and to correlate the additions of alkali with those observations so as to impart to the residual sewage a pH value of approximately within the preferred range.

The other reaction product or products in the precipitation of the metal hydroxide (for example, calcium sulphate in the reaction of ferric sulphate and lime to precipitate ferric hydroxide) are ordinarily soluble in the residual sewage in the relatively minute amounts in which they are present, and accordingly do not enter the settleable sludge. The sludge is accordingly made up of the suspended putrescible matter (which may be readily destroyed by a roasting heat) and the metal hydroxide, which fact makes possible the economic recovery and regeneration of the metal compound for the treatment of additional sewage.

The sewage treatment of the invention not only effectively removes putrescible matter but also effects a very substantial removal of bacteria. A large proportion of the bacteria removal takes place in the concentration and removal of the suspended matter and a further substantial removal of bacteria takes place during the base-exchanging reaction.

We claim:

1. The method of treating sewage which comprises removing putrescible matter suspended in the sewage by precipitating a metal hydroxide within a body of the sewage and separating the resulting precipitate therefrom, and then removing putrescible matter in solution in the residual sewage by treatment with an agent in the nature of a base-exchange zeolite.

2. The method of treating sewage which comprises subjecting the sewage to the action of an insoluble metal base capable of collecting the suspended putrescible matter in a settleable sludge, separating the sludge from the residual sewage, and subjecting the residual sewage to a base-exchange reaction in the course of which a putrescible base in solution in the sewage is exchanged for a non-putrescible base.

3. The method of treating sewage containing relatively small concentrations of putrescible matter both in suspension and in solution which comprises concentrating the suspended putrescible matter in the presence of a metal base into a settleable sludge, separating said sludge from the residual sewage, treating said sludge to regenerate said metal base and to render innocuous the putrescible matter associated therewith, and subjecting said residual sewage to a base-exchange reaction in the course of which a putrescible base in solution in the sewage is exchanged for a non-putrescible base.

4. The method of treating sewage containing relatively small concentrations of putrescible matter both in suspension and in solution which comprises concentrating the suspended putrescible matter in the presence of a metal base into a settleable sludge, separating said sludge from the residual sewage, subjecting said residual sewage to a base-exchange reaction in the course of which ammonia and/or some amine bases in solution in the sewage are exchanged for an alkali-metal base, and treating the spent reactive medium in said base-exchanging reaction to regenerate the medium and to recover ammonia therefrom.

5. In the treatment of sewage containing putrescible matter in solution, the steps of subjecting the sewage to a base-exchange reaction in the course of which the ammonia base in solution in the sewage is exchanged for a base that is non-putrescible, and treating the spent reactive medium in said base-exchange reaction to regenerate the medium.

6. In the treatment of sewage containing putrescible matter in solution, the steps of treating the sewage with an agent in the nature of a base-exchange zeolite in the course of which the ammonia base in the putrescible matter is exchanged for a base in the agent which is non-putrescible, and treating the spent agent with a salt of its initial base to extract ammonia and to regenerate the agent.

7. In the treatment of sewage containing putrescible matter in solution, the steps of passing the sewage through a base-exchanging body of zeolite in the course of which the ammonia base in the putrescible matter is exchanged for the sodium base in the zeolite, and treating the spent zeolite with a solution of sodium chloride to extract ammonia and to regenerate zeolite for reuse.

8. The method of treating sewage which comprises introducing a soluble iron compound into the sewage, treating the sewage with an alkali to precipitate ferric hydroxide, separating the precipitate from the residual sewage, treating the precipitate to regenerate said soluble iron compound, and passing the residual sewage through a base-exchange medium in the course of which the ammonia base in the putrescible matter in solution in the sewage is exchanged for a base that is non-putrescible.

9. The method of treating sewage which comprises introducing a soluble iron compound into the sewage, treating the sewage with an alkali to precipitate ferric hydroxide, separating the precipitate from the residual sewage, treating the precipitate to regenerate said soluble iron compound, and passing the residual sewage through a base-exchange medium of the nature of zeolite in the course of which the ammonia base in the putrescible matter in solution in the sewage is exchanged for an alkali-metal base, and regenerating the base-exchange medium by treatment of the spent medium with an alkali-metal compound.

10. The method of treating sewage which comprises introducing ferric sulphate into the sewage, treating the sewage with an alkali to precipitate ferric hydroxide, separating the precipitate from the residual sewage, dehydrating the precipitate and treating the residue with sulphuric acid to regenerate ferric sulphate, passing the residual sewage through a body of zeolite in the course of which the ammonia base in solution in the sewage is exchanged for the alkali-metal base in the zeolite, and treating the spent zeolite with a solution of an alkali-metal salt to extract ammonia and to regenerate zeolite for reuse.

11. The method of treating sewage containing relatively small concentrations of putrescible matter both in suspension and in solution which comprises concentrating the suspended putrescible matter by the action of an insoluble substance capable of collecting and carrying down the suspended putrescible matter in a settleable sludge, separating said sludge from the residual sewage, and subjecting the residual sewage to a base-exchange reaction in the course of which a putrescible base in solution in the sewage is exchanged for a base that is non-putrescible.

12. The method of treating sewage containing relatively small concentrations of putrescible matter both in suspension and in solution which comprises concentrating the suspended putrescible matter by the action of an insoluble substance capable of collecting and carrying down the suspended putrescible matter in a settleable sludge, separating said sludge from the residual sewage, and removing putrescible matter in solution in the residual sewage by treatment with an agent in the nature of a base-exchange zeolite.

13. The method of treating sewage containing relatively small concentrations of putrescible matter both in suspension and in solution which comprises treating the sewage with a soluble metal compound and an alkali capable of reacting therewith to form an insoluble metal hydroxide which collects substantially all of the suspended putrescible matter in the resulting precipitate, the additions of alkali to the sewage being correlated in amount with the pH value of the incoming sewage to impart to the residual sewage (after separation of said precipitate) a pH value within a predetermined range, and subjecting said residual sewage to a base-exchange reaction in the course of which a putrescible base in solution therein is exchanged for a base that is non-putrescible.

14. The method of treating sewage containing relatively small concentrations of putrescible matter both in suspension and in solution which comprises treating the sewage with a soluble metal compound and a base capable of reacting therewith to form an insoluble metal hydroxide which collects substantially all of the suspended putrescible matter in the resulting precipitate, separating said precipitate from the residual sewage, subjecting said residual sewage to a base-exchange reaction in the course of which a putrescible base in solution therein is exchanged for a base that is non-putrescible, treating the spent base-exchange medium with a compound of said non-putrescible base to extract said putrescible base therefrom and to regenerate the medium, and utilizing the putrescible base so extracted as the base in the formation of metal hydroxide as aforesaid.

In testimony whereof we affix our signatures.

GEORGE H. GLEASON.
ALFRED C. LOONAM.